United States Patent
Nie et al.

[11] Patent Number: 6,061,098
[45] Date of Patent: May 9, 2000

[54] CIRCUIT CONFIGURATION FOR FILTERING AND DECIMATING A VIDEO SIGNAL

[75] Inventors: Xiaoning Nie, Vaterstetten; Soenke Mehrgardt, Deisenhofen, both of Germany

[73] Assignee: Siemens Aktiengesellschaft, Munich, Germany

[21] Appl. No.: 09/038,601

[22] Filed: Mar. 11, 1998

[30] Foreign Application Priority Data

Mar. 11, 1997 [DE] Germany .................. 197 09 976

[51] Int. Cl.$^7$ ........................................ H04N 9/74
[52] U.S. Cl. ..................... 348/582; 348/568; 348/566
[58] Field of Search ................... 348/565, 566, 348/567, 568, 582, 581, 708, 453; 358/22, 13, 11; H04N 9/64, 9/74, 11/00, 11/02, 11/04

[56] References Cited

U.S. PATENT DOCUMENTS 4,821,086   4/1989   McNeely et al. ................ 348/566

FOREIGN PATENT DOCUMENTS 5-252530   9/1999   Japan ....................... H04N 9/64

OTHER PUBLICATIONS

"IC Set for a picture–in–picture system with on–chip memory" (Burkert et al.), IEEE Transactions on Consumer Electronics. vol. 36, No. 1, Feb. 1990, pp. 23–31.
"New picture–in–picture LSI enhanced functionality for high picture quality" (Honzawa et al.), IEEE Transactions on Consumer Electronics, vol. 36, No. 3, Aug. 1990, pp. 387–394.

*Primary Examiner*—David E. Harvey
*Attorney, Agent, or Firm*—Herbert L. Lerner; Laurence A. Greenberg; Werner H. Stemer

[57] ABSTRACT

The circuit simultaneously filters and decimates a video signal formed with samples for luminance and chrominance. A subcircuit provides the samples in distinct sequences with alternate luminance and chrominance values. A filter stage is provided which contains a first adder which is supplied with one of the sequences via a first register. The other terminal of the adder is supplied with the other sequence. A second register can be directly connected to the adder if luminance samples are processed, and via a third register if chrominance samples are processed. The output signal of the second register is combined with the samples of one of the sequences by means of an adder at the output end. In the case of a higher degree of the filter, a number of filter stages are cascaded (connected in series). Where a higher degree of decimation is required, feedback is provided in each filter stage.

8 Claims, 1 Drawing Sheet

CIRCUIT CONFIGURATION FOR FILTERING AND DECIMATING A VIDEO SIGNAL

BACKGROUND OF THE INVENTION

Field of the Invention

The invention relates to a circuit configuration for filtering and decimating a sequence of component signals for luminance and chrominance for a video signal.

In digital signal processing in television sets, pixels are represented by component signals for luminance and chrominance. In a conventional format, a pair or two samples for the brightness Y is in each case allocated one sample for two color signal components U, V (format Y:U:V=4:2:2).

In the case of picture-in-picture insertion (PIP), for example, a decimation of the original video signal to the picture size to be inserted is required in order to reduce the size of the picture to be inserted. A decimation factor of 2 means that if the luminance and chrominance samples have in each case a first sampling rate, the samples for luminance and chrominance of the decimated video signal are at half the original rate. To avoid aliasing errors in the undersampling, limiting of the bandwidth of the original video signal by means of suitable low-pass filtering is required.

SUMMARY OF THE INVENTION

It is accordingly an object of the invention to provide a circuit for filtering and decimating a video signal, which overcomes the above-mentioned disadvantages of the prior art devices and methods of this general type and which circuit is as compact as possible and with which simultaneous filtering and decimation of a video signal is made possible.

With the foregoing and other objects in view there is provided, in accordance with the invention, a circuit configuration for filtering and decimating component signals for luminance and chrominance in a video signal, comprising:

a subcircuit outputting a first sequence and a second sequence of video signal samples alternately containing one sample of luminance and one sample of chrominance at a first terminal and a second terminal;

a filter stage connected to the first and second terminals, the filter stage including a first adder connected to the first and second terminals and a first delay element connected between the first terminal the first adder;

a second adder connected to the first terminal;

a second delay element and a change-over switch connected between the second adder and the first adder, the change-over switch selectively connecting the second delay element two the first adder via a third delay element; and and an output terminal connected to the first adder for outputting a decimated output signal.

In other words, the circuit comprises a filter stage which contains as essential elements three registers and two adders, if necessary, means for scaling or weighting the received input signals. In the case of an integrated implementation, the filter stage occupies a relatively small area. By connecting a number of filter stages in series, a higher-order filter providing better adaptation to a desired ideal frequency response is obtained. Decimation by a higher factor is possible by means of feedback inside each filter stage.

In accordance with an added feature of the invention, the video signal samples are a sequence of quadruples of samples each comprising a first and a second sample for luminance and a first and a second sample for chrominance, and wherein the subcircuit outputs one sequence at the first and second terminals with the first luminance samples and another sequence at the first and second terminals with the second luminance samples, and wherein two successive chrominance samples are allocated to an identical quadruple and the quadruples are different in the first and second sequence.

In accordance with an additional feature of the invention, the subcircuit comprises a first input terminal receiving luminance samples and a second input terminal receiving chrominance samples, a first multiplexer having an input directly connected to the second input terminal and an input connected via a delay element to the second input terminal, two further multiplexers each having an output respectively connected to one of the first and second terminals, the further multiplexers each having an input connected directly to the first input terminal and an input connected an output of the first multiplexer.

In accordance with another feature of the invention, the sequences of samples at the first and second terminals have a predetermined clock frequency, and wherein the first and second delay elements of the filter stage receive the samples at the predetermined clock frequency and the third delay element receives the samples at half the predetermined clock frequency, and the change-over switch of the filter stage is switchable at the predetermined clock frequency.

In accordance with a further feature of the invention, there are provided means connected between the first and second terminals and the adders for multiplicatively weighting the samples of the sequences.

In accordance with again another feature of the invention, there is provided a substantially identical further filter stage. Instead of connecting its input (at the first delay element) to the first output terminal of the subcircuit which provides the sample sequences, its input connects to the output of the first filter stage.

In accordance with again a further feature of the invention, the filter stage includes a feedback loop connected to feed back an output of the second delay element to the first delay element, and a multiplexer and an adder connected in the feedback loop, the adder having a first input connected to the multiplexer and a second input connected to one of the first and second terminals of the subcircuit.

In accordance with a concomitant feature of the invention, there is provided a switch connected between the output terminal for outputting the decimated output signal and an output of the second delay element of the filter stage.

Other features which are considered as characteristic for the invention are set forth in the appended claims.

Although the invention is illustrated and described herein as embodied in circuit configuration for filtering and decimation of a video signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
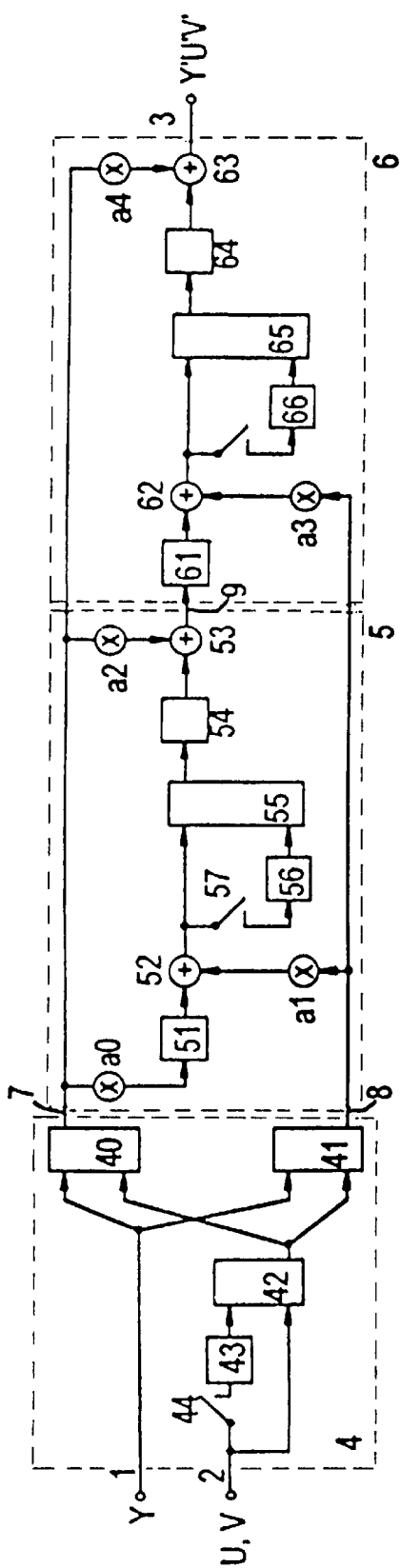
FIG. 1 is a circuit diagram showing a filter circuit with two filter stages.

Referring now to the figures of the drawing in detail and first, particularly, to FIG. 1 thereof, there is seen a circuit with an input terminal 1 receiving samples for the luminance signal component Y and a terminal 2 receiving samples for the two chrominance signal components U, V of a video signal. The sequence of samples at the terminals 1 and 2 in each case have a first input clock frequency, for example 27 MHz. At an output terminal 3, the filtered and decimated samples for luminance Y' and the chrominance component signals U', V' can be jointly picked up. In the example shown, the sample rate at the terminal 3 is 27 MHz, samples for the luminance signal component Y' being present at half the sample rate at the input end of 13.5 MHz and the chrominance signal components U', V' are jointly also present at half the sample rate at the input end of 13.5 MHz. The following sample sequences are present at the terminals 1, 2, 3:

Terminal 1: Y0 Y1 Y2 Y3 Y4 Y5 Y6 Y7 . . .
Terminal 2: U0 V0 U2 V2 U4 V4 U6 V6 . . .
Terminal 3: Y0' U0' Y2' V0' Y4' U4' Y6' V4' . . .

A subcircuit 4 provide the input samples at terminals 7, 8 in such a manner that one luminance sample Y in each case alternates with a chrominance sample U or V. The following sample sequences are present at the terminals 7, 8:

Terminal 7: Y0 U0 Y2 V0 Y4 U4 Y6 V4 . . .
Terminal 8: 0 Y1 U2 Y3 V2 Y5 U6 Y7 . . .

Assuming that a pair of two samples Y, e.g. Y0 and Y1 is in each case allocated a pair from a sample of the first and the second chroma signal component, e.g. U0 and V0, so that Y0, Y1, U0, V0 form a quadruple of luminance and chrominance samples which are allocated to two pixels of a video picture, the sequence at the terminal 7 in each case only contains the first luminance samples of various quadruples, the sequence at the terminal 8 contains the second luminance samples of the quadruples, two successive samples for chrominance at each terminal belonging to the same quadruple. It follows that the chrominance samples of terminals 7 and 8 in each case belong to different quadruples.

The sample sequences at the terminals 7 and 8 are supplied into cascaded filter stages 5, 6 by means of which simultaneous low-pass filtering and decimation are performed. A filtered and decimated output video signal is already present at an output 9 of the first stage 5. The subsequent stage 6 increases the degree of the filter and thus the quality of filtering. In principle, the terminal 3 can be followed by corresponding further filter stages.

In detail, circuit blocks 4, 5, 6 are constructed as follows: The circuit block 4 outputs through two multiplexers 40, 41, the outputs of which form the terminals 7 and 8. A first input of each of the multiplexers 40, 41 is connected to the terminal 1. A second input of each of the multiplexers 40, 41 is connected to a further multiplexer 42, the input of which is optionally connected directly or via a delay element 43, for example a register, and a switch 44 to the input terminal 2. The sample sequences described above can be generated at terminals 7, 8 by suitably controlling the elements 40 . . . 44. For this purpose, the multiplexers 40, 41 are switched at 27 MHz, the multiplexer 42 is connected three times to its upper input connection and once to its lower input in the 27 MHz pattern, and the switch 44 is operated at 6.75 MHz.

The filter stage 5 includes a first register 51, the input of which is coupled to the terminal 7. The values present at the terminal 7 are scaled or multiplied by a weighting factor a0 before being fed into the register 51. The output of the register 51 is connected to an adder 52 which is also connected to the terminal 8 via the weighting factor al. The filter stage 5 outputs through an adder 53 which is connected to the terminal 7 via a weighting factor a2 and to a second delay element 54. The delay element 54 receives its input signals from a multiplexer or changeover switch 55, the input of which is selectively connectible directly to an adder 52 or via a third delay element 56 and a switch 57 to the adder 52. The register 56 intermittently stores values associated with the chrominance signal components output by the adder 52. If the adder 52 outputs a value which can be associated with the luminance signal component, this is supplied to the multiplexer 55 and the register 54 via the direct link. The registers 51 and 54 are operated at 27 MHz. The multiplexer 55 is driven at 13.5 MHz. The register 56 is loaded with new values at 13.5 MHz by the switch 57, which is being switched at that frequency.

The filter stage 6 is constructed in accordance with the filter stage 5. The input register 61 corresponds to the register 56 and is connected to output 9 of the filter stage 5. The adder 62 located at the input end is supplied with the samples of terminal 8 via the weighting factor a3, register 63 located at the output end is supplied with the samples of terminal 7 via the weighting factor a4. The output of the adder 63 forms the output 3 of the filter stage 6 and of the overall circuit. To increase the degree of the filter, further stages 6 can be correspondingly connected to terminal 3.

The illustrated filter has the transfer function $$a0\ z^{-4}+a1z^{-3}+a2\ z^{-2}+a3\ z^{-1}+a4$$

and effects a decimation by a decimation factor of 2. In the table which follows, the operation of the circuit is represented by referring to the register contents for a number of operating cycles:

| Clock cycle | Reg. 51 | Reg. 56 | Reg 54 | Register 61 | Register 66 | Register 64 | Terminal 3 |
|---|---|---|---|---|---|---|---|
| 0 | a0Y0 | 0 | 0 | a2Y0 | 0 | 0 | a4Y0 |
| 1 | a0U0 | 0 | a1Y1+a0Y0 | a2U0 | 0 | a3Y1+a2Y0 | a4U0 |
| 2 | a0Y2 | a1U2+a0U0 | 0 | a2Y2+a1Y1+a0Y0 | a3U2+a2U0 | 0 | a4Y2+a3Y1+a2Y0 |
| 3 | a0V0 | a1U2+a0U0 | a1Y3+a0Y2 | a2V0 | a3U2+a2U0 | a3Y3+a2Y2+ a1Y1+a0Y0 | a4V0 |
| 4 | a0Y4 | a1V2+a0V0 | a1U2+a0U0 | a2Y4+a1Y3+a0Y2 | a3V2+a2V0 | a3U2+a2U0 | a4Y4+a3Y3+ a2Y2+a1Y1+a0Y0 |
| 5 | a0U4 | a1V2+a0v0 | a1Y5+a0Y4 | a2U4+a1U2+a0U0 | a3V2+a2V0 | a3Y5+a2Y4+ a1Y3+a0Y2 | a4U4+a3U2+a2U0 |

-continued

| Clock cycle | Reg. 51 | Reg. 56 | Reg 54 | Register 61 | Register 66 | Register 64 | Terminal 3 |
|---|---|---|---|---|---|---|---|
| 6 | a0Y6 | a1U6+a0U4 | a1V2+a0V0 | a2Y6+a1Y5+a0Y4 | a3U6+a2U4+ a1U2+a0U0 | a3V2+a2V0 | a4Y6+a3Y5+ a2Y4+a1Y3+a0Y2 |
| 7 | a0V4 | a1U6+a0U4 | a1Y7+a0Y6 | a2V4+a1V2+a0V0 | a3U6+a2U4+ a1U2+a0U0 | a3Y7+a2Y6+ a1Y5+a0Y4 | a4V4+a3v2+a2V0 |

The table shows that samples are present in the sequence Y, U, Y, V in the timing pattern of 27 MHz at output terminal 3. During operating cycles 4 and 6, the filter has already settled with respect to the samples for Y output. For the remaining output values, for example the samples for U and V during operating cycles 5 and 7, the filter has not yet completely settled.

Figure 2:
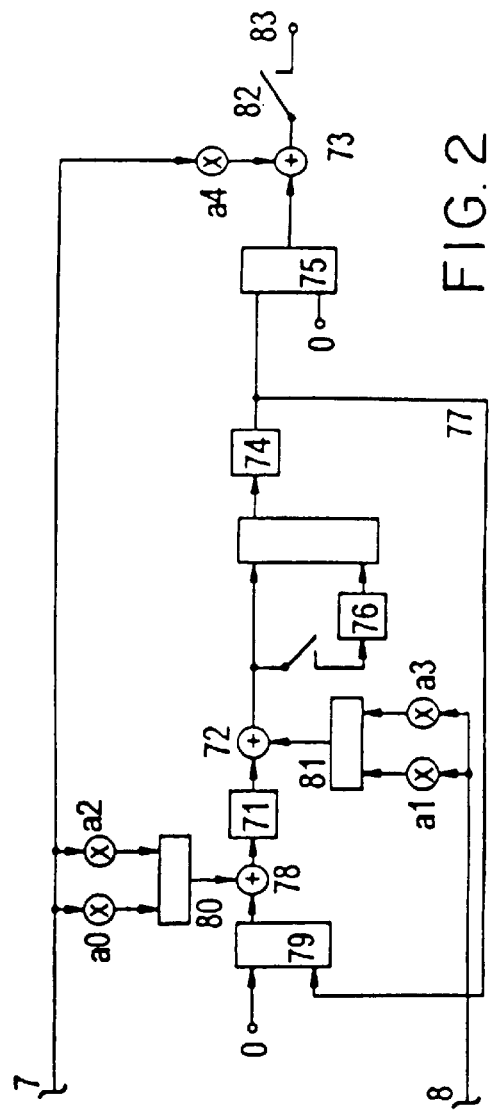
FIG. 2 is a circuit diagram of a filter stage with feedback for higher decimation factor.

FIG. 2 shows a different embodiment of the filter stage 5 by means of which the corresponding filter function is produced with a decimation by a factor of 4. Corresponding elements are provided with corresponding reference numerals. Delay elements 71, 74, 76 correspond to delay elements 51, 54, 56 and 61, 64, 66. Due to the quadruple undersampling, the filter structure can be used twice in order to calculate both the lower-order terms and the higher-order terms of the filter function. This is effected by a feedback path 77 which additively feeds the output of register 74 back to the input end of register 71. For this purpose, an adder 78 is provided which, on the one hand, is connected to terminal 7 and, on the other hand, to the feedback path via a multiplexer 79. A multiplexer 75 is provided in order to isolate the adder 73 from the register 74 during the feedback phase.

If the low-order terms are calculated with the feedback disconnected, the value "0" is supplied via multiplexer 79. During this phase of the calculation, the structure shown in FIG. 2 is connected like filter stage 5. The coefficients are supplied to the adders 78, 72 via respective multiplexers 80 and 81, respectively. The former multiplexer 80 switches between coefficients a0 and a2 and the latter multiplexer 81 switches between coefficients a1, a3. At the output terminal, a switch 82 is provided for picking up the calculated values with the correct timing.

In the case of a higher degree of the filter formed by an integral multiple of four, further such stages follow the output. With a degree of the filter of, say, 8, the filter stage shown in FIG. 2 is followed by a further corresponding filter stage. The upper input of the corresponding multiplexer 79 in this further filter stage is then connected to output 83 instead of the value "0". In addition, the filter stage shown in FIG. 2 is correspondingly used, the difference being that the input values at the terminals 7 and 8 are coupled in via the multiplexers 80 and 81 via four respective different weighting coefficients which are in each case connected into the circuit with the correct timing.

The resultant register loading of the filter and decimation circuit shown in FIG. 2 is as follows for a number of operating cycles:

| Clock | Register 71 | Register 76 | Register 74 | Terminal 83 |
|---|---|---|---|---|
| 0 | a0Y0 | 0 | 0 | a4Y0 |
| 1 | a0U0 | 0 | a0Y0+a1Y1 | a4U0 |
| 2 | a0Y0+a1Y1+a2Y2 | a0U0+a1U2 | 0 | a4Y2 |
| 3 | a0V0 | a0U0+a1U2 | a0Y0+a1Y1+a2Y2+a3Y3 | a4V0 |
| 4 | a0Y4 | a0V0+a1V2 | a0U0+a1U2 | a0Y0+a1Y1+a2Y2 a3Y3+a4Y4 |
| 5 | a0U0+a1U2+a2U4 | a0V0+1V2 | a0Y4+a1Y5 | a4U4 |
| 6 | a0Y4+a1Y5+a2Y6 | a0U0+a1U2+2U4+a3U6 | a0V0+a1V2 | a4Y6 |
| 7 | a0V0+a1V2+a2V4 | a0U0+a1U2+a2U4+a3U6 | a0Y4+a1Y5+a2Y6+a3Y7 | a4V4 |
| 8 | a0Y8 | a0V0+a1V2+a2V4+a3V6 | a0U0+a1U2+a2U4+a3U6 | a0Y4+a1Y5+ a2Y6+a3Y7+a4Y2 |

At terminal 83, the output values are picked up in the sequence Y, U, V, Y by means of appropriate control of the switch 82. In comparison with the clock rate of the input values, the samples of the output sequence are undersampled four times. These values are underlined in the above table.

In the case of a symmetric transfer function of the filter, the filter coefficients are mirror-symmetric to the center filter term. This means, for example, that coefficients a4 and a0 are equal. The weighting means which are equal in each case can then be combined in the circuits of FIG. 1 and FIG. 2.

In the case of a degree of the filter which is in each case higher by one, for example in the case of a degree of the filter of 3, the stage 5 is only followed by the register 61 and the adder 62. The signal received from the terminal 8 is weighted by the multiplication factor a3. The filtered and decimated output signal is picked up at the output of the adder 62.

We claim:

1. A circuit configuration for filtering and decimating component signals for luminance and chrominance in a video signal, comprising:
   a subcircuit outputting a first sequence and a second sequence of video signal samples alternately containing one sample of luminance and one sample of chrominance at a first terminal and a second terminal;
   a filter stage connected to said first and second terminals, said filter stage including
      a first adder connected to said first and second terminals and a first delay element connected between said first terminal said first adder;

a second adder connected to said first terminal;

a second delay element and a change-over switch connected between said second adder and said first adder, said change-over switch selectively connecting said second delay element to said first adder via a third delay element; and and an output terminal connected to said first adder for outputting a decimated output signal.

2. The circuit configuration according to claim 1, wherein the video signal samples are a sequence of quadruples of samples each comprising a first and a second sample for luminance and a first and a second sample for chrominance, and wherein the subcircuit outputs one sequence at the first and second terminals with the first luminance samples and another sequence at the first and second terminals with the second luminance samples, and wherein two successive chrominance samples are allocated to an identical quadruple and the quadruples are different in the first and second sequence.

3. The circuit configuration according to claim 1, wherein the subcircuit comprises a first input terminal receiving luminance samples and a second input terminal receiving chrominance samples, a first multiplexer having an input directly connected to said second input terminal and an input connected via a delay element to said second input terminal, two further multiplexers each having an output respectively connected to one of said first and second terminals, said further multiplexers each having an input connected directly to said first input terminal and an input connected an output of said first multiplexer.

4. The circuit configuration according to claim 3, wherein the sequences of samples at said first and second terminals have a predetermined clock frequency, and wherein said first and second delay elements of said filter stage receive the samples at the predetermined clock frequency and said third delay element receives the samples at half the predetermined clock frequency, and said change-over switch of said filter stage is switchable at the predetermined clock frequency.

5. The circuit configuration according to claim 1, which further comprises means connected between said first and second terminals and said adders for multiplicatively weighting the samples of the sequences.

6. The circuit configuration according to claim 1, wherein said filter stage is a first one of substantially identical first and second filter stages, said second filter stage having a first delay element connected to said output terminal of said first filter stage.

7. The circuit configuration according to claim 1, wherein said filter stage includes a feedback loop connected to feed back an output of said second delay element to said first delay element, and a multiplexer and an adder connected in said feedback loop, said adder having a first input connected to said multiplexer and a second input connected to one of said first and second terminals of said subcircuit.

8. The circuit configuration according to claim 1, which further comprises a switch connected between said output terminal for outputting the decimated output signal and an output of said second delay element of said filter stage.

* * * * *